(12) United States Patent
Johnson et al.

(10) Patent No.: US 10,987,879 B2
(45) Date of Patent: Apr. 27, 2021

(54) METHODS OF MANUFACTURING ROTOR BLADE COMPONENTS FOR A WIND TURBINE

(71) Applicant: General Electric Company, Schenectady, NY (US)

(72) Inventors: Stephen Bertram Johnson, Greenville, SC (US); Xu Chen, Simpsonville, SC (US); Jamie T. Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 15/447,248

(22) Filed: Mar. 2, 2017

(65) Prior Publication Data

US 2018/0252202 A1 Sep. 6, 2018

(51) Int. Cl.
| | | |
|---|---|---|
| B29C 70/34 | (2006.01) | |
| B29L 31/08 | (2006.01) | |
| B29C 70/52 | (2006.01) | |
| F03D 1/06 | (2006.01) | |

(52) U.S. Cl.
CPC ........... *B29C 70/342* (2013.01); *B29C 70/52* (2013.01); *B29L 2031/085* (2013.01); *F03D 1/0675* (2013.01); *F05B 2230/31* (2013.01); *F05B 2240/221* (2013.01); *F05B 2280/6013* (2013.01); *F05B 2280/6015* (2013.01); *Y02E 10/72* (2013.01); *Y02P 70/50* (2015.11)

(58) Field of Classification Search
CPC ..... B29C 70/382; B29C 70/386; B29C 70/48; B29C 70/682
See application file for complete search history.

(56) References Cited

U.S. PATENT DOCUMENTS

| | | | | |
|---|---|---|---|---|
| 2,667,664 A | * | 2/1954 | Ferrell | .................... B28B 19/00 264/72 |
| 4,664,961 A | * | 5/1987 | Vees | .................... B29C 70/226 112/412 |
| 8,353,674 B2 | | 1/2013 | Bech | |
| 8,529,717 B2 | * | 9/2013 | Hedges | ................. B29C 70/083 156/83 |
| 8,702,397 B2 | * | 4/2014 | Babu | .................... F03D 1/0675 416/226 |
| 9,035,981 B2 | | 5/2015 | Dal Col et al. | |
| 2002/0106469 A1 | * | 8/2002 | Fanucci | ................ B29C 70/083 428/36.9 |

(Continued)

FOREIGN PATENT DOCUMENTS

JP 2011/038518 A 2/2011

*Primary Examiner* — Matthew J Daniels
(74) *Attorney, Agent, or Firm* — Dority & Manning, P.A.

(57) ABSTRACT

The present disclosure is directed to a method of manufacturing a rotor blade component of a wind turbine is disclosed. The method includes placing at least one first pultruded member into a curved rotor blade component mold. More specifically, the first pultruded member includes at least one design characteristic configured to allow the first pultruded member to sit substantially flush against an inner surface of the curved rotor blade component mold. The method also includes placing at least one second pultruded member atop the at least one first pultruded member and infusing the first and second pultruded members together to form the rotor blade component.

6 Claims, 6 Drawing Sheets

(56) References Cited

U.S. PATENT DOCUMENTS

| | | | |
|---|---|---|---|
| 2004/0253114 A1* | 12/2004 | Gunneskov | F03D 1/065 416/224 |
| 2006/0225278 A1* | 10/2006 | Lin | F03D 13/10 29/889.72 |
| 2007/0140861 A1* | 6/2007 | Wobben | B29C 70/86 416/230 |
| 2010/0135818 A1* | 6/2010 | Babu | F03D 1/0683 416/226 |
| 2011/0008175 A1* | 1/2011 | Gau | B29C 65/5085 416/233 |
| 2014/0271217 A1 | 9/2014 | Baker | |
| 2015/0316027 A1* | 11/2015 | Sandercock | B29C 70/52 416/230 |
| 2016/0009034 A1* | 1/2016 | Moors | B29D 99/0028 264/511 |
| 2016/0146184 A1 | 5/2016 | Caruso et al. | |
| 2016/0160837 A1 | 6/2016 | Geiger et al. | |
| 2016/0273516 A1 | 9/2016 | Smith et al. | |
| 2017/0002792 A1 | 1/2017 | Yarbrough et al. | |
| 2017/0030330 A1* | 2/2017 | Caruso | F03D 1/065 |
| 2017/0114773 A1* | 4/2017 | Riahi | B29C 70/52 |
| 2020/0095978 A1* | 3/2020 | Rodwell | F03D 1/0641 |

* cited by examiner

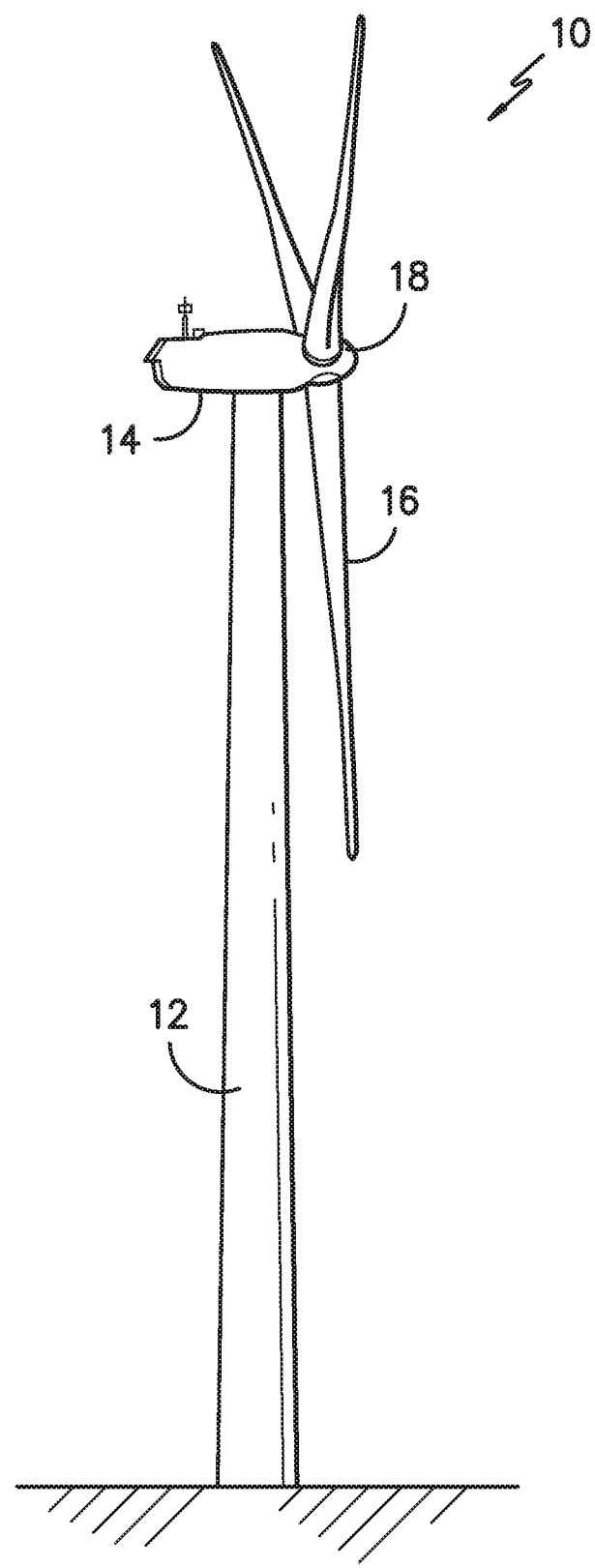
FIG. -1-

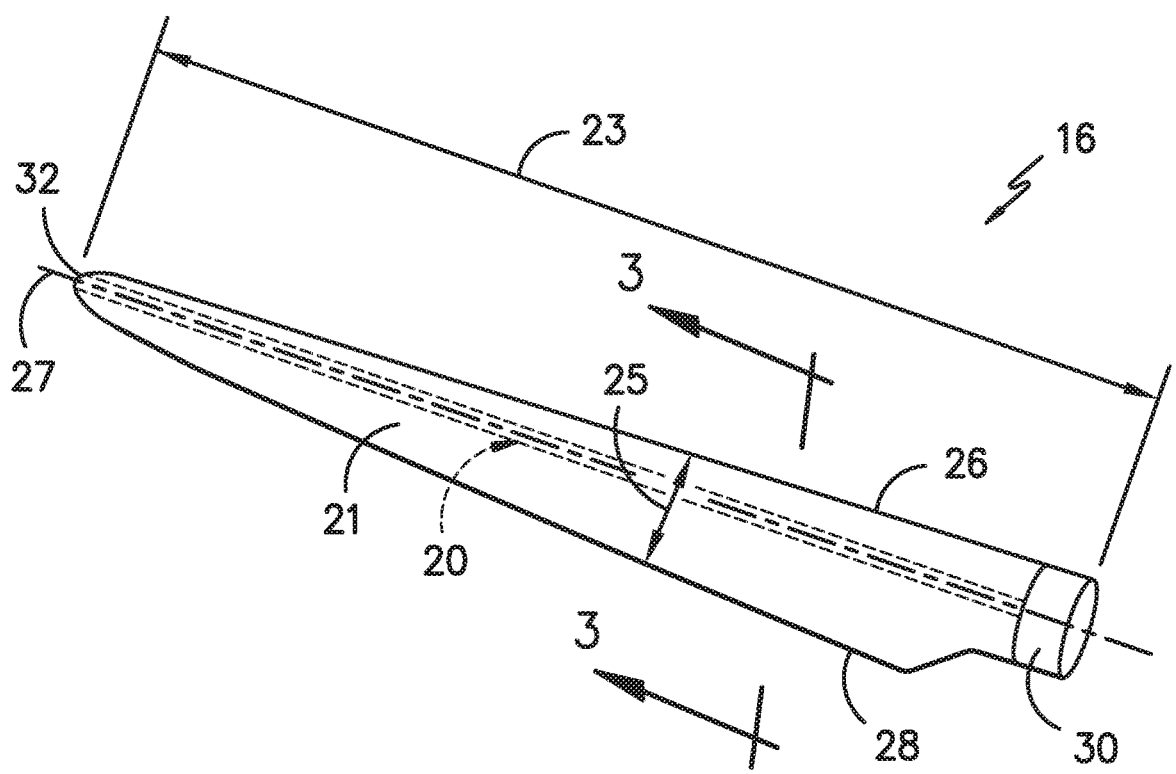
FIG. -2-
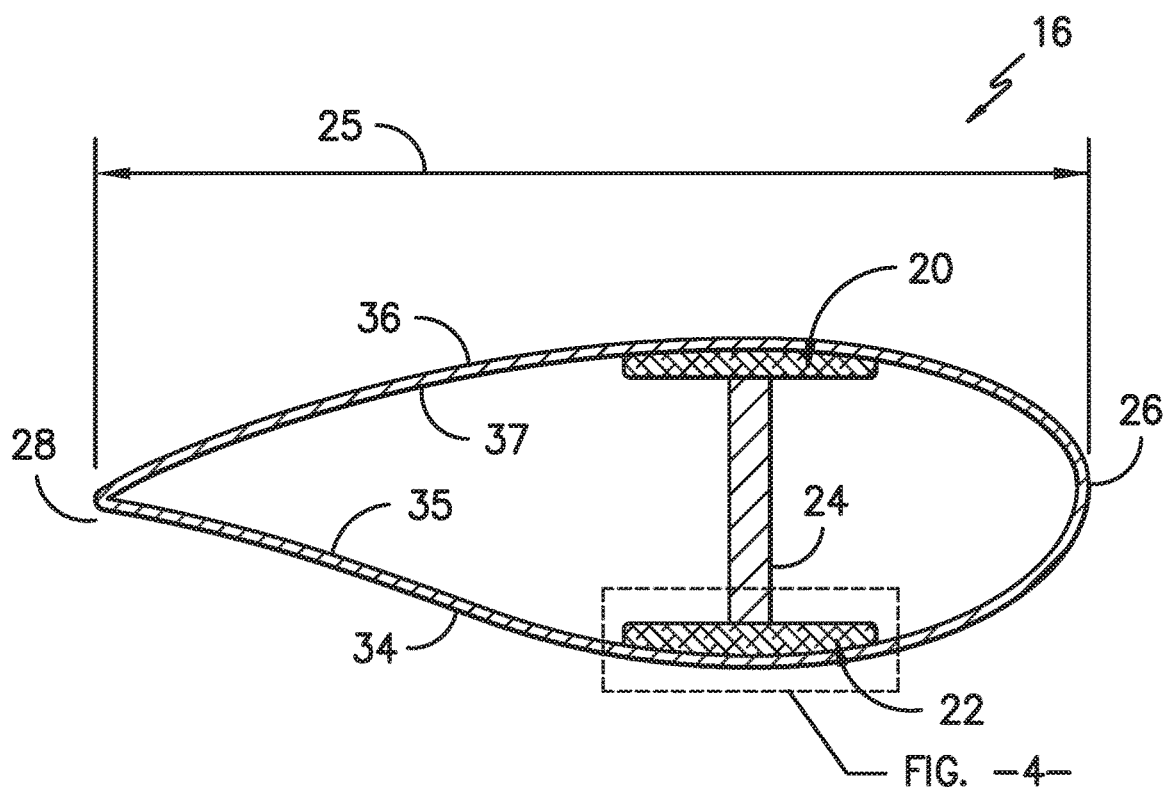
FIG. -3-

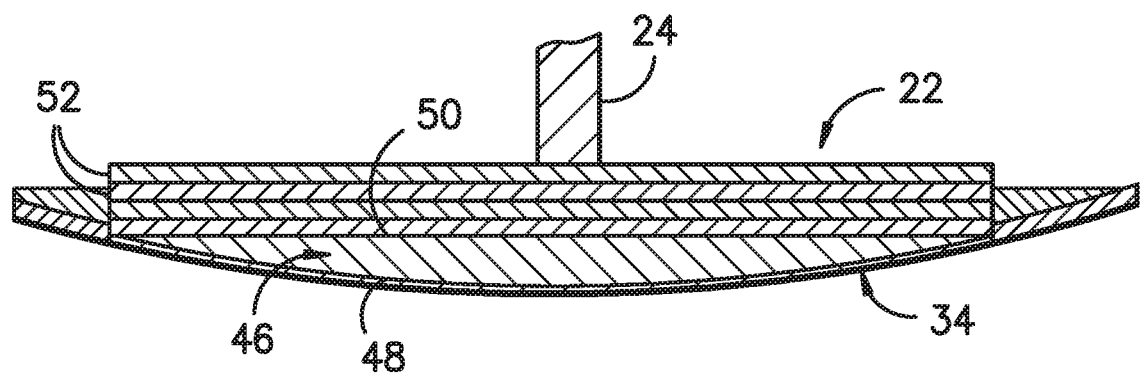
FIG. -4-
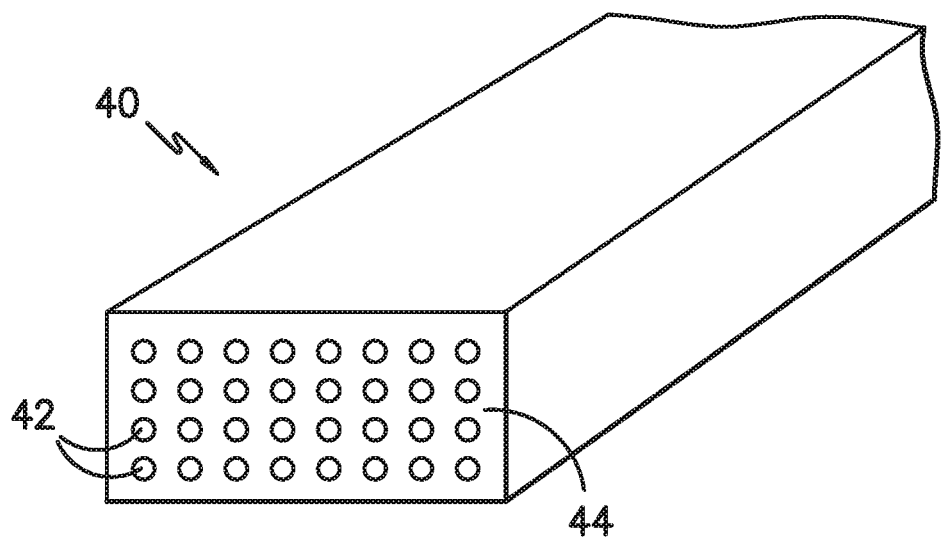
FIG. -5-

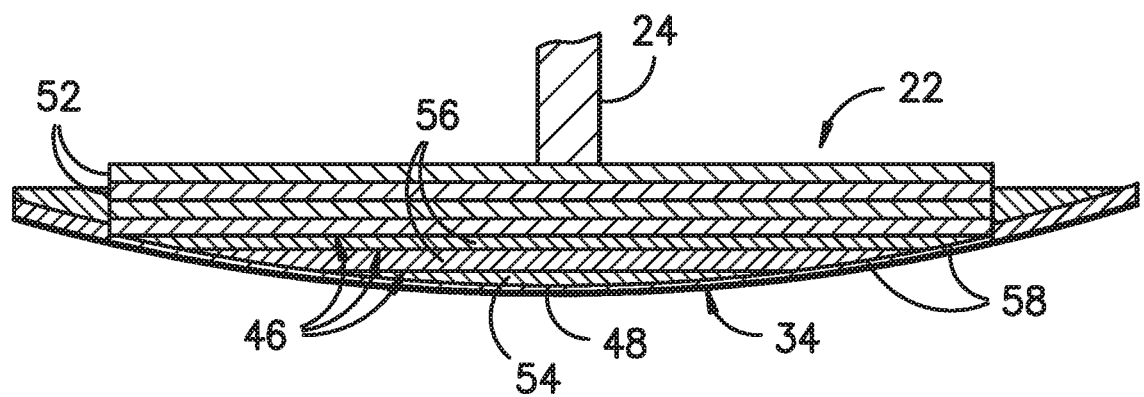
FIG. -6-
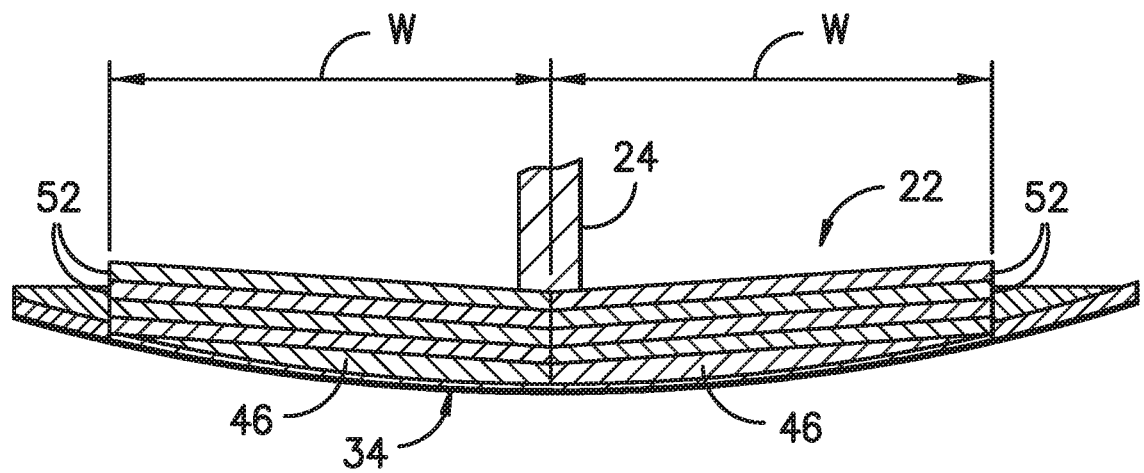
FIG. -7-

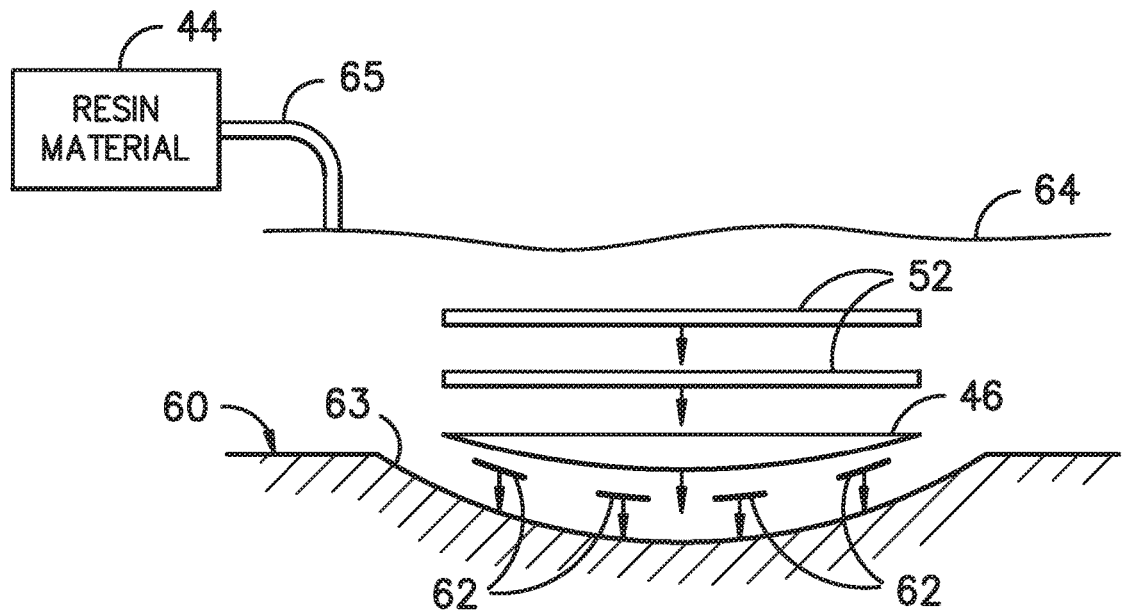

FIG. -8-

PLACE AT LEAST ONE FIRST PULTRUDED MEMBER INTO A CURVED ROTOR BLADE COMPONENT MOLD, THE FIRST PULTRUDED MEMBER COMPRISING AT LEAST ONE DESIGN CHARACTERISTIC CONFIGURED TO ALLOW THE FIRST PULTRUDED MEMBER TO SIT SUBSTANTIALLY FLUSH AGAINST AN INNER SURFACE OF THE CURVED ROTOR BLADE COMPONENT MOLD

PLACE AT LEAST ONE SECOND PULTRUDED MEMBER ATOP THE AT LEAST ONE FIRST PULTRUDED MEMBER

INFUSE THE FIRST AND SECOND PULTRUDED MEMBERS TOGETHER TO FORM THE ROTOR BLADE COMPONENT

FIG. -9-

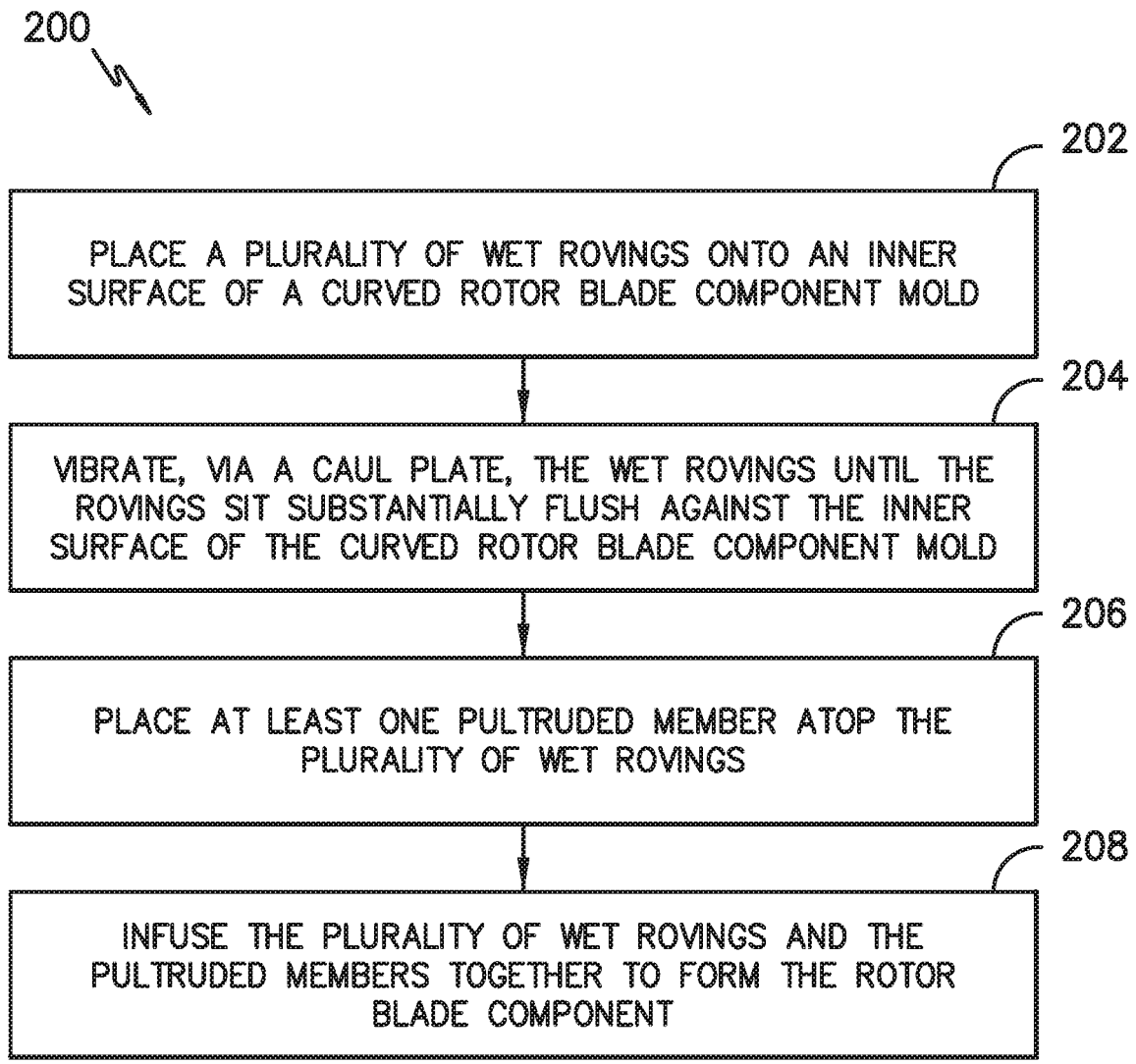
FIG. -10-

METHODS OF MANUFACTURING ROTOR BLADE COMPONENTS FOR A WIND TURBINE

FIELD OF THE INVENTION

The present subject matter relates generally to wind turbine rotor blades and, more particularly, to methods for manufacturing rotor blade components, such as spar caps, for a wind turbine using pultruded members.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding edges of the rotor blade. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell halves. The spar caps may be constructed of various materials, including but not limited to glass fiber laminate composites and/or carbon fiber laminate composites. Such materials, however, can be difficult to control, defect prone, and/or highly labor intensive due to handling of the dry fabrics and the challenges of infusing large laminated structures.

As such, modern spar caps may be constructed of pre-fabricated, pre-cured (e.g. pultruded) composites that can be produced in thicker sections, and are typically less susceptible to defects. As used herein, the terms "pultruded composites," "pultrusions," "pultruded members" or similar generally encompass reinforced materials (e.g. fibers or woven or braided strands) that are impregnated with a resin and pulled through a heated stationary die such that the resin cures or undergoes polymerization. As such, the process of manufacturing pultruded composites is typically characterized by a continuous process of composite materials that produces composite parts having a constant cross-section. Accordingly, the pultruded composites can eliminate various concerns and challenges associated with using dry fabric alone.

Most pultrusions are have a flat cross-section (e.g. are square or rectangular) because such shapes are easy to cut and bevel. Though the use of flat pultrusions can offer a significant improvement in cost and producability of rotor blade components, such pultrusions do not typically lay into curved molds without gaps between the pultrusions and the mold shape. Conformance to the mold can be achieved to a certain degree by breaking the pultrusions into thinner strips; however, this increases the cost of the pultrusion material, the cost of machining the pultrusions, and/or the difficulty of placing the pieces into the mold.

Accordingly, the art is continuously seeking new and improved methods of manufacturing rotor blade components, such as spar caps, using pultrusions. More specifically, methods of manufacturing rotor blade components using pultruded members having a special shape corresponding to the component mold would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method of manufacturing a rotor blade component of a wind turbine. The method includes placing at least one first pultruded member into a curved rotor blade component mold. More specifically, the first pultruded member includes at least one design characteristic configured to allow the first pultruded member to sit substantially flush against an inner surface of the curved rotor blade component mold. The method also includes placing at least one second pultruded member atop the at least one first pultruded member and infusing the first and second pultruded members together to form the rotor blade component.

In one embodiment, the rotor blade component may include a spar cap, a bond cap, a root ring, or any other rotor blade component having a curved shape. In another embodiment, the design characteristic(s) of the first pultruded member(s) may include a curved surface, one or more tapered side edges, and/or a reduced width. As such, in particular embodiments, a first side of the first pultruded member(s) may include the curved surface, whereas an opposing surface of the pultruded member may be flat.

In further embodiments, the method may include placing a plurality of first pultruded members having a reduced width in a side-by-side configuration. In additional embodiments, the method may include placing a plurality of first pultruded members atop one another (i.e. in a stacked configuration). In such embodiments, a lower first pultruded member may have a curved surface, whereas one or more upper first pultruded members may have tapered side edges. As such, when arranged together, the upper and lower first pultruded members have a shape that more closely corresponds to the inner surface of the curved rotor blade component mold than conventional rectangular pultrusions.

In yet another embodiment, the method may include placing a plurality of second pultruded members atop the flat surface of the first pultruded member(s). In additional embodiments, the method may include placing the plurality of second pultruded members atop the first pultruded member(s) in a side-by-side configuration, i.e. in two or more stacks.

In still further embodiments, the method may include placing one or more fiber materials in the curved rotor blade component mold prior to placing the at least one first pultruded member, e.g. so as to account for deviations in the curvature of the mold.

In another aspect, the present disclosure is directed to a method of manufacturing a rotor blade component of a wind turbine. The method includes placing a plurality of wet rovings onto an inner surface of a curved rotor blade component mold. As used herein, rovings generally encompass long and narrow bundles of fibers that are not combined until joined by a cured resin. The method also includes vibrating the wet rovings until they sit substantially flush against the inner surface of the curved rotor blade component mold. Further, the method includes placing at least pultruded member atop the plurality of wet rovings. Moreover, the method includes infusing the plurality of wet rovings and the pultruded members together to form the rotor blade component.

In yet another aspect, the present disclosure is directed to a rotor blade of a wind turbine. The rotor blade includes a pressure side, a suction side, a leading edge, and a trailing edge extending between a blade tip and a blade root. In addition, the rotor blade includes a spar cap configured with at least one of the pressure side or the suction side of the rotor blade. The spar cap includes at least one first pultruded member having a design characteristic configured to allow the first pultruded member to sit substantially flush against an inner surface of a curved rotor blade component mold. Further, the spar cap includes at least one second pultruded member arranged adjacent to and infused with the at least one first pultruded member via a resin material. In addition, it should be understood that the rotor blade may include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one of the rotor blades of FIG. 1;

FIG. 3 illustrates a cross-sectional view of the rotor blade of FIG. 2 along line 3-3;

FIG. 4 illustrates a cross-sectional view of one embodiment of a spar cap according to the present disclosure, particularly illustrating a spar cap formed from a first pultruded member having a curved surface and an opposing flat surface with a plurality of second pultruded members stacked against the flat surface of the first pultruded member;

FIG. 5 illustrates a perspective view of one of the pultruded members of the spar cap of FIG. 4;

FIG. 6 illustrates a cross-sectional view of one embodiment of a spar cap according to the present disclosure, particularly illustrating a spar cap formed from a plurality of first pultruded members having a curved surface and/or tapered side edges with a plurality of second pultruded members stacked against the first pultruded members;

FIG. 7 illustrates a cross-sectional view of one embodiment of a spar cap according to the present disclosure, particularly illustrating a spar cap formed from a plurality of first pultruded members having a curved surface and a reduced width and arranged in a side-by-side configuration with a plurality of second pultruded members stacked against the first pultruded members;

FIG. 8 illustrates a schematic view of one embodiment of a rotor blade component mold with first and second pultruded members being placed therein and vacuum infused together according to the present disclosure;

FIG. 9 illustrates a flow diagram of one embodiment of a method of manufacturing rotor blade components according to the present disclosure; and FIG. 10 illustrates a flow diagram of another embodiment of a method of manufacturing rotor blade components according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a method of manufacturing a rotor blade component of a wind turbine. The method includes placing at least one first pultruded member into a curved rotor blade component mold. More specifically, the first pultruded member includes at least one design characteristic configured to allow the first pultruded member to sit substantially flush against an inner surface of the curved rotor blade component mold. The method also includes placing at least one second pultruded member atop the at least one first pultruded member and infusing, e.g. via vacuum infusion, the first and second pultruded members together to form the rotor blade component.

It should be noted that the assembly and joining of the pultruded members can take place in either a dedicated prefabrication mold (e.g. a spar cap mold), directly in a blade shell mold, or, for example, in a spar beam assembly mold. During layup of the pultruded members, it may also be appropriate to interleave materials which facilitate the infusion process. Also, in addition to vacuum infusion, the pultruded members may also be joined by interleaving the pultruded members with pre-preg material, using film adhesive(s), and/or any other suitable joining technology.

The present disclosure provides many advantages not present in the prior art. For example, the uniquely-shaped first pultruded member more easily enables full width flat pultruded plates to be utilized in construction of the rotor blade component. As such, the methods of the present disclosure provide simpler cut and bevel operation due to fewer pultrusion pieces. Thus, the methods of the present disclosure also provide simpler handling of the completed stack of cut and/or beveled pultruded members. In addition, the methods described herein reduce bending of the flat pultruded members under vacuum pressure.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively.

Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

The methods of manufacturing rotor blade components as described herein may be applied to any suitable rotor blade components. For example, in one embodiment, the rotor blade component may include a spar cap, a bond cap, a root ring, or any other rotor blade component having a curved shape. In other words, the rotor blade components as described herein typically include an aerodynamic shape and are constructed of unique pultrusions which more closely corresponds to the aerodynamic shape of the component on one side, and is flat on the opposite side. Though the figures illustrate the unique pultruded members 40 being used to form a spar cap 22, it should also be understood that the pultruded members 40 as described herein may be used to construct various other rotor blade components, in addition to the spar cap 22.

Referring now to FIGS. 4 and 6-7, various embodiments of a spar cap 22 according to the present disclosure are illustrated. More specifically, as shown, cross-sectional views of the spar cap 22 constructed of a plurality of pultruded members 40 or plates arranged in layers according to the present disclosure are illustrated. For example, as shown in the illustrated embodiment, each of the pultruded members 40 may form a single layer of the spar cap 22. The layers are then be stacked atop one another and joined together using any suitable means, for example, via vacuum infusion. In addition, FIG. 5 illustrates one of the pultruded members 40 formed of a resin material 44 reinforced with one or more fiber materials 42.

Referring particularly to FIGS. 4 and 6-7, the spar cap 22 includes at least one first pultruded member 46 having a design characteristic configured to allow the first pultruded member 46 to sit substantially flush against an inner surface of a curved rotor blade component mold and at least one flat, second pultruded member 52 arranged with the first pultruded member(s) 46. Further, the first and second pultruded members 46, 52 are infused together via a resin material. For example, in one embodiment, the resin material may include a thermoplastic material or a thermoset material.

A thermoplastic material as described herein generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, a thermoset material as described herein generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

Referring still to FIGS. 4, 6, and 7, the design characteristic(s) of the first pultruded member(s) 46 may include a curved surface 48, one or more tapered side edges 58, or a reduced width W. For example, as shown in FIG. 4, the spar cap 22 includes a single first pultruded member 46 having a first side with a curved surface 48, whereas an opposing surface 50 of the pultruded member 46 may be flat.

In additional embodiments, as shown in FIG. 6, the spar cap 22 may include a plurality of first pultruded members 46 stacked against each other. In such embodiments, one or more lower first pultruded members 54 may have a curved surface 48, whereas one or more upper first pultruded members 56 may have tapered side edges 58. For example, as shown, the spar cap 22 includes one lower first pultruded member 54 and two additional upper first pultruded members 56 with tapered side edges 58 stacked atop the lower first pultruded member 54. As such, the curved surface 48 and the tapered edges 58 are configured to sit flush with the component mold during manufacturing, which is discussed in more detail herein. In other embodiments, the spar cap 22 may include any number of upper and/or lower first pultruded members so as to achieve a desired thickness of the component. In addition, as shown in FIGS. 4 and 6-7, the spar cap 22 may include a plurality of second pultruded members 52 arranged or stacked against the flat surface 50 of the first pultruded member(s) 46.

Referring particularly to FIG. 7, the spar cap 22 may further include a plurality of first pultruded members 46 having a reduced width W arranged in a side-by-side configuration. As used herein, a reduced width W generally refers to a width that is less than an overall width of the spar cap 22 (or any other rotor blade component). Thus, by providing multiple first pultruded members 46 with a reduced width W and/or more than one shape, the spar cap 22 may be able to better conform to the shape of the inner surface 63 of the component mold 60 during manufacturing of the part. In addition, as shown, the spar cap 22 may also include a plurality of the second pultruded members 52 arranged or stacked against the first pultruded member(s) 46 in a side-by-side configuration. For example, as shown in FIG. 7, two stacks of the flat second pultruded members 52 form the spar cap 22 so as to better conform to the shape of the inner surface 63 of the component mold 60 during the manufacturing process.

Referring now to FIG. 9, a flow diagram of one embodiment of a method 100 of manufacturing a rotor blade component of a wind turbine 10 is disclosed. For example, as mentioned, the rotor blade component may include a spar cap, a bond cap, a root ring, or any other rotor blade component having a curved shape. As shown at 102, the method 100 includes placing at least one first pultruded member 46 into a curved rotor blade component mold 60 (FIG. 8). More specifically, as mentioned, the first pultruded member 46 includes at least one design characteristic configured to allow the first pultruded member 46 to sit substantially flush against an inner surface 63 of the curved rotor blade component mold 60. For example, in one embodiment, the design characteristic(s) of the first pultruded member(s) 46 may include a curved surface, one or more tapered side edges 58, or a reduced width W. As such, in particular embodiments, a first side of the first pultruded member(s) 46 may include the curved surface 48, whereas an opposing surface 50 of the pultruded member 46 may be flat. In further embodiments, the method 100 may include placing a plurality of first pultruded members 46 having a reduced width W in a side-by-side configuration (FIG. 7). In additional embodiments, as shown in FIG. 6, the method 100 may include placing a plurality of first pultruded members 46 atop one another. In such embodiments, as mentioned, a lower first pultruded member 54 may have a curved surface 48, whereas one or more upper first pultruded members 56 may have tapered side edges 58.

Referring still to FIG. 9, as shown at 104, the method 100 also includes placing at least one flat, second pultruded member 52 atop the first pultruded member(s) 46. In yet another embodiment, the method 100 may include placing a plurality of the flat second pultruded members 52 atop the flat surface 50 of the first pultruded member(s) 46. More specifically, as shown in FIG. 7, the method 100 may include placing the plurality of flat second pultruded members 52 atop the first pultruded member(s) 52 in a side-by-side configuration.

Once the first and second pultruded members 46, 52 are arranged in the curved rotor blade component mold 60 in the desired configuration, the method 100 includes infusing the first and second pultruded members 46, 52 together to form the rotor blade component, as shown at 106 of FIG. 9. More specifically, as mentioned, the first and second pultruded members 46, 52 may be infused together via vacuum infusion using any suitable resin material 44. For example, as shown in FIG. 8, once the first and second pultruded members 46, 52 are arranged in the curved rotor blade component mold 60 in the desired configuration, a vacuum bag 64 can be secured atop the mold 60 and vacuum pressure can be used to drive the resin material 44 into the mold 60 via a resin feed line 65 to form the spar cap 22.

In additional embodiments, the method 100 may also include placing one or more fiber or pre-preg materials 62 in the curved rotor blade component mold 60 prior to placing the first pultruded member(s) 46 therein, e.g. so as to account for deviations in the curvature of the mold. More specifically, in certain embodiments, the fiber material 62 may include glass fibers, carbon fibers, polymer fibers, ceramic fibers, nanofibers, metal fibers, or similar. Further, in particular embodiments, the pre-preg materials may include carbon or glass fibers pre-impregnated with epoxy, vylnester, polyester, or other suitable thermoset or thermoplastic resin.

Referring now to FIG. 10, a flow diagram of another embodiment of a method 200 of manufacturing a rotor blade component of a wind turbine 10 is disclosed. As shown at 202, the method 200 includes placing a plurality of wet rovings onto an inner surface of a curved rotor blade component mold. As shown at 204, the method 200 includes vibrating the wet rovings until the rovings sit substantially flush against the inner surface of the curved rotor blade component mold. More specifically, in certain embodiments, the wet rovings may be vibrated using a caul plate or a pultruded member. In addition, one or more flat pultruded members 40 may be put on top of the wet rovings, similar to the caul plate. As shown at 206, the method 200 includes placing at least one pultruded member atop the plurality of wet rovings. As shown at 208, the method 200 includes infusing the plurality of wet rovings and the pultruded members together to form the rotor blade component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a component of a rotor blade of a wind turbine, the method comprising:

placing at least one lower first pultruded member into a curved component mold, the at least one lower first pultruded member being configured to sit substantially flush against an inner surface of the curved component mold, the at least one lower first pultruded member having a width which is less than an overall width of the component of the rotor blade;

placing at least one upper first pultruded member atop the at least one lower first pultruded member, the at least one upper first pultruded member having a flat upper and lower faces, the flat upper face having a width that is greater than a width of the flat lower face, the at least one upper first pultruded member further comprising tapered side edges that taper from the flat lower face to the flat upper face;

placing at least one second pultruded member atop the flat upper face of the at least one upper first pultruded member; and infusing the at least one upper first pultruded member, the at least one lower first pultruded member, and the second pultruded member together to form the component of the rotor blade.

2. The method of claim 1, wherein the component of the rotor blade comprises at least one of a spar cap, a bond cap, or a root ring.

3. The method of claim 1, wherein the at least one lower first pultruded member has a first side which is a curved surface and an opposing surface which is flat.

4. The method of claim 3, further comprising placing a plurality of second pultruded members atop the at least one upper first pultruded member.

5. The method of claim 1, further comprising placing a plurality of upper first pultruded members atop one another.

6. The method of claim 1, further comprising placing one or more fiber materials in the curved component mold prior to placing the at least one lower first pultruded member.

* * * * *